(12) United States Patent
Russell

(10) Patent No.: US 6,212,625 B1
(45) Date of Patent: Apr. 3, 2001

(54) GENERAL PURPOSE DYNAMICALLY PROGRAMMABLE STATE ENGINE FOR EXECUTING FINITE STATE MACHINES

(75) Inventor: Richard G. Russell, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/318,148

(22) Filed: May 25, 1999

(51) Int. Cl.[7] ............................. G06F 9/305; G06F 11/34
(52) U.S. Cl. ............................ 712/217; 710/19; 710/267; 714/39; 716/16; 716/17
(58) Field of Search ................................. 710/65, 19, 129, 710/30, 267; 717/4, 6; 716/1–4, 19, 18, 17, 16; 703/13, 14; 714/39; 707/533; 712/217, 26; 711/149, 169

(56) References Cited

U.S. PATENT DOCUMENTS

| | | | |
|---|---|---|---|
| 4,450,520 | * 5/1984 | Hollaar et al. | 710/65 |
| 5,450,598 | 9/1995 | Kaplan et al. | 395/800 |
| 5,481,717 | * 1/1996 | Gaboury | 717/4 |
| 5,517,432 | 5/1996 | Chandra et al. | 364/578 |
| 5,537,580 | 7/1996 | Giomi et al. | 395/500 |
| 5,539,680 | 7/1996 | Palnitkar et al. | 364/578 |
| 5,706,473 | 1/1998 | Yu et al. | 395/500 |

OTHER PUBLICATIONS

*Registered Logic Design*, Rev. A, Advanced Micro Devices, Inc., Feb. 1996, Chapter 5, pp. 40–59.
*State Machine Design*, Rev. A, Advanced Micro Devices, Inc., Jun. 1993, Chapter 5, pp. 60–71.

* cited by examiner

Primary Examiner—Daniel H. Pan
(74) Attorney, Agent, or Firm—Akin, Gump, Strauss, Hauer & Feld, L.L.P.

(57) ABSTRACT

A general purpose dynamically programmable state engine dynamically executes finite state machines and finite state machine models. The state engine includes an input and filter unit, a storage unit, a transition unit, and an action generation unit. The storage unit stores a state entry table including a plurality of state entries. Each state entry in the storage unit includes a state identifier, a symbol identifier, a plurality of state attributes, and a next state. The input and filter unit accepts inputs and translates the inputs to symbols. The symbols are provided to the transition unit. The transition unit maintains a current state and locates a state entry in the storage unit having a state identifier matching the current state and a symbol identifier matching a current symbol. The current state is set to a next state of a matching entry by the transition unit when the matching entry is a terminating entry. When a terminating entry is detected, an action generation unit for processing the terminating entry is activated. A finite state machine may be configured for execution by the state engine using a state machine development tool.

15 Claims, 5 Drawing Sheets

GENERAL PURPOSE DYNAMICALLY PROGRAMMABLE STATE ENGINE FOR EXECUTING FINITE STATE MACHINES

BACKGROUND OF THE INVENTION

1. Field of the Invention

The present invention relates to finite state machines for microcontrollers, and more particularly to a general purpose dynamically programmable state engine for executing finite state machines.

2. Description of the Related Art

MICROCONTROLLERS

As technology advances, computer system components are providing specific services which previously were offered by a microprocessor or the computer system as a whole. A centerpiece of this advancing technology is known as a microcontroller, or embedded controller, which in effect is a microprocessor as used in a personal computer, but with a great deal of additional functionality combined onto the same monolithic semiconductor substrate (i.e., chip). In a typical personal computer, the microprocessor performs the basic computing functions, but other integrated circuits perform functions such as communicating over a network, controlling the computer memory, and providing input/output with the user.

In a typical microcontroller, many of these functions are embedded within the integrated circuit chip itself. A typical microcontroller, such as the Am186EM or AM186ES by Advanced Micro Devices, Inc., of Sunnyvale, Calif., not only includes a core microprocessor, but further includes a memory controller, a direct memory access (DMA) controller, an interrupt controller, and both asynchronous and synchronous serial interfaces. In computer systems, these devices are typically implemented as separate integrated circuits, requiring a larger area and increasing the size of the product. By embedding these functions within a single chip, size is dramatically reduced, often important in consumer products.

From a consumer products designer's viewpoint, often the particular combination of added features make a particular microcontroller attractive for a given application. Many microcontrollers are available that use the standard x86 microprocessor instructions, allowing for software to be easily developed for such microcontrollers. Because of the similar execution unit instruction sets, the added features often become principal differentiating criteria between particular microcontrollers.

In implementing microcontrollers in embedded systems, another common requirement or desirable feature is the reduction of the bandwidth needed by any particular portion of the microcontroller in negotiating with other portions. For example, the core of a microcontroller is the execution unit, which is essentially a microprocessor core. An execution unit should be free to perform the programmed task to which it is dedicated, rather than spending time waiting on other units within the microcontroller.

STATE MACHINES

For many system control applications, sequential logic designers are utilizing state machines rather than complex microprocessors to provide speed and sufficient functionality without undue complexity. One advantage of transferring certain functions from a microprocessor to a state machine is freeing the microprocessor to perform other functions. Examples of functions which have been efficiently translated into state machines include vector control for a Fast Fourier Transform (FFT) algorithm, addressing by a controller, encoding and decoding, encryption and decryption, arbitration, event monitoring, and simple control functions.

A state machine is essentially a digital device that traverses through a predetermined sequence of states in an orderly fashion. A simple state machine includes two essential elements: combinatorial logic and memory. The memory is used to store the state of the machine. The combinatorial logic may be viewed as two distinct functional blocks: the next state decoder and the output decoder. The next state decoder determines the next state of the state machine while the output decoder generates the actual outputs. A state machine traverses through a sequence of states, where the next state is determined by the next state decoder, depending upon the current state and input conditions. A state machine also provides sequences of output signals and/or actions based upon state transitions. The outputs are generated by the output decoder based upon the current state and input conditions. There are two widely known types of state machines: Mealy and Moore. Moore state machine outputs are a function of the current state only. In Mealy-type state machines, the outputs are functions of both the current state and the input conditions.

Parts of digital systems whose outputs depend on their past inputs as well as their current ones can be modeled as finite state machines. A finite state machine provides a finite number of states and transitions, with each transition originating in a state and leading to a state. The "history" of a finite state machine is summed up in the value of its internal state. When a new input is presented to a finite state machine, an output is generated which depends on this input and the current state of the finite state machine. The finite state machine is then moved into a new state, referred to as the next state. The next state depends on both the input and the current state. Finite state machines, which may be considered abstract models for synchronous sequential machines, have become an integral part of logic circuits.

One traditional approach to executing or evaluating a finite state machine has been loading a state table file. A state table file, which is typically generated by a compiler, is commonly in the form of a hardware description file. The state information for executing the finite state machine may be extracted from the state table file by a compiler or state machine analyzer. Using the extracted state information, a compiler or state machine analyzer may generate a data structure representing the finite state machine.

So far as is known, prior art compilers and state machine analyzers have not provided for dynamic execution of finite state machines or a methodology for executing different types of finite state machines.

SUMMARY OF THE INVENTION

Briefly, a system according to the present invention may provide a general purpose dynamically programmable state engine for executing a finite state machine. The general purpose dynamically programmable state engine may include an input and filter unit, a storage unit, a transition unit, and an action generation unit. The storage unit stores a plurality of state entries. Each state entry in the storage unit may include a state identifier, a symbol identifier, a plurality of state attributes, and a next state. The input and filter unit receives inputs and translates the inputs to symbols. The symbols are provided to the transition unit. The transition unit maintains a current state and locates a state entry in the state and transition storage unit having a state identifier matching the current state and a symbol identifier matching a current symbol. The transition unit also sets the current state to a next state of a matching entry. When a matching entry is a terminating entry, an action generation unit for processing the terminating entry is activated.

A state engine in accordance with the present invention permits execution of a finite state machine to be independent of the hardware implementation of the finite state machine. The state engine also provides for dynamic execution of a finite state machine. Another aspect of the state engine is the capability of executing a plurality of finite state machines.

BRIEF DESCRIPTION OF THE DRAWINGS

A better understanding of the present invention can be obtained when the following detailed description of the invention is considered in conjunction with the following drawings, in which.

DETAILED DESCRIPTION OF THE INVENTION

Figure 1:
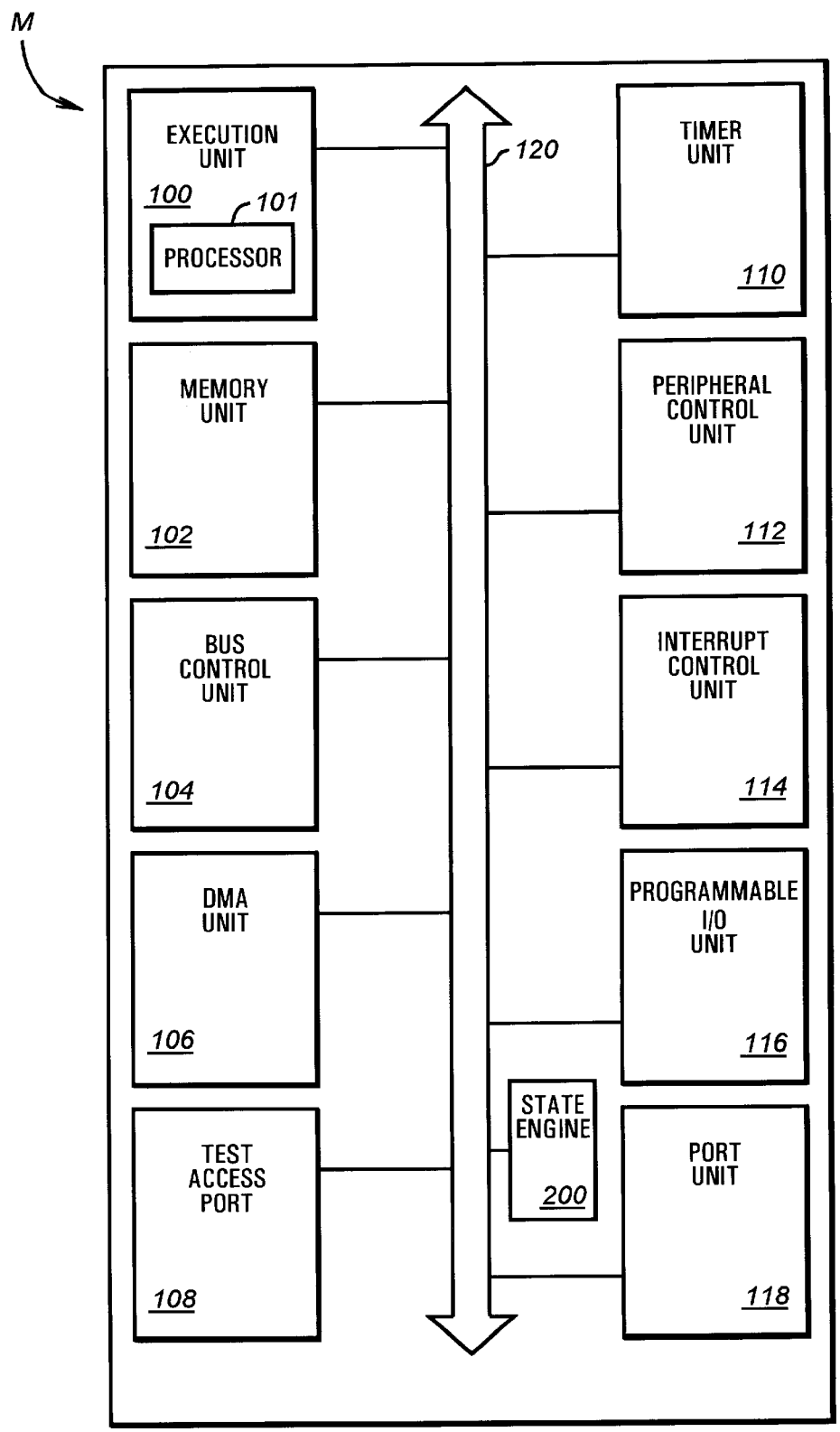
FIG. 1 is a block diagram of a microcontroller providing a state engine in accordance with the present invention.

Turning now to the drawings, FIG. 1 shows a block diagram of an exemplary architecture for a microcontroller M in accordance with the present invention. The microcontroller M may support a variety of on-chip units. In the illustrated architecture, an execution unit 100, a memory unit 102, a bus control unit 104, a direct memory access (DMA) unit 106, a test access port 108, a timer unit 110, a peripheral control unit 112, an interrupt control unit 114, a programmable I/O unit 116, and a port unit 118 are each coupled to a system bus 120. The system bus 120 may include a data bus, address bus, and control bus for communicating data, addresses and control information between any of these coupled units.

The execution unit 100 may provide a highly integrated processor 101 for executing code stored by the memory unit 102. The execution unit 100 in the disclosed embodiment is compatible with the Am186 instruction set implemented in a variety of microcontrollers from Advanced Micro Devices, Inc. of Sunnyvale, Calif. A variety of other execution units could be used instead of the execution unit 100.

The memory unit 102 may support multiple memory controllers for controlling communication of data to and from off-chip memory devices. These memory devices for example may include dynamic random access memory (DRAM), read only memory (ROM), and/or flash memory. An example of a memory controller is a DRAM controller providing extended data out (EDO) and synchronous DRAM (SDRAM) support, write buffering support, and read-ahead buffering support.

The bus control unit 104 may provide a host of bus controllers for controlling a variety of buses and supporting the peripherals connected to those buses. These bus controllers for example may include a USB (Universal Serial Bus) controller, an ISA (Industry Standard Architecture) bus controller, a PCI (Peripheral Component Interconnect) bus controller, a General Purpose Bus controller, and/or a VL-Bus controller. The bus control unit 104 thus permits the microcontroller M to support a number of external buses and peripherals.

The DMA unit 106 may provide multiple DMA controllers having several DMA channels for controlling direct memory access transfers between the units of the microcontroller M. In accordance with the present invention, the DMA unit 106 provides a DMA engine 150 for supporting multiple virtual DMA channels. The test access port 108 provides a scan interface for testing the microcontroller M in a production environment and supports a test access port (TAP) controller for controlling test logic of the port 108.

The peripheral control unit 112 may provide a host of integrated peripheral controllers for controlling a variety of peripheral devices. These peripheral controllers, for example, may include a graphics controller, a keyboard controller, and/or a PC Card controller. The graphics controller preferably provides an internal unified memory architecture (UMA) and software compatibility with a variety of graphic adapters. The PC Card controller or adapter preferably conforms to PCMCIA (Personal Computer Memory Card International Association) standards.

The interrupt control unit 114 may provide multiple interrupt controllers for supporting several interrupt requests. Each interrupt controller may regulate issuance and acceptance of its associated interrupt requests. The programmable I/O unit 116 supports several general-purpose I/O pins. These pins provide a parallel interface for external devices to the microcontroller M. The port unit 118 may provide a standard parallel port interface, serial port interface, and/or infrared port interface. The parallel port interface may support an enhanced parallel port (EPP) mode for high speed transfers. The serial port interface and infrared interface may be driven by an industry-standard universal asynchronous receiver/transmitter (UART) so as to permit PC compatibility. In accordance with the present invention, a state engine 200 for executing a plurality of finite state machines may be provided as an on-chip unit.

A variety of configurations and combinations of these units of the microcontroller M are possible. The microcontroller M, for example, could be the Am186™ED microcontroller, the Elan™ SC400 microcontroller, or the Am186™CC microcontroller. It should be understood that the disclosed units are illustrative and not exhaustive. A number of the illustrated units could be eliminated, or added to, without detracting from the spirit of the invention. Further, selection of the particular units supported by the microcontroller M may be a function of the particular microcontroller application. As an example, for a mobile computing application, an infrared port interface, graphics controller, and PC Card controller may be supported. As another example, for a communications application, a USB controller and an HLDC (High-Level Data Link Control) controller may be supported. The disclosed microcontroller M thus provides architectural flexibility.

The techniques and circuitry according to the invention could be applied to a wide variety of microcontrollers. The term "microcontroller" itself has different definitions in the industry. Some companies refer to a processor core with additional features (such as I/O) as "microprocessor" if it has no on-board memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
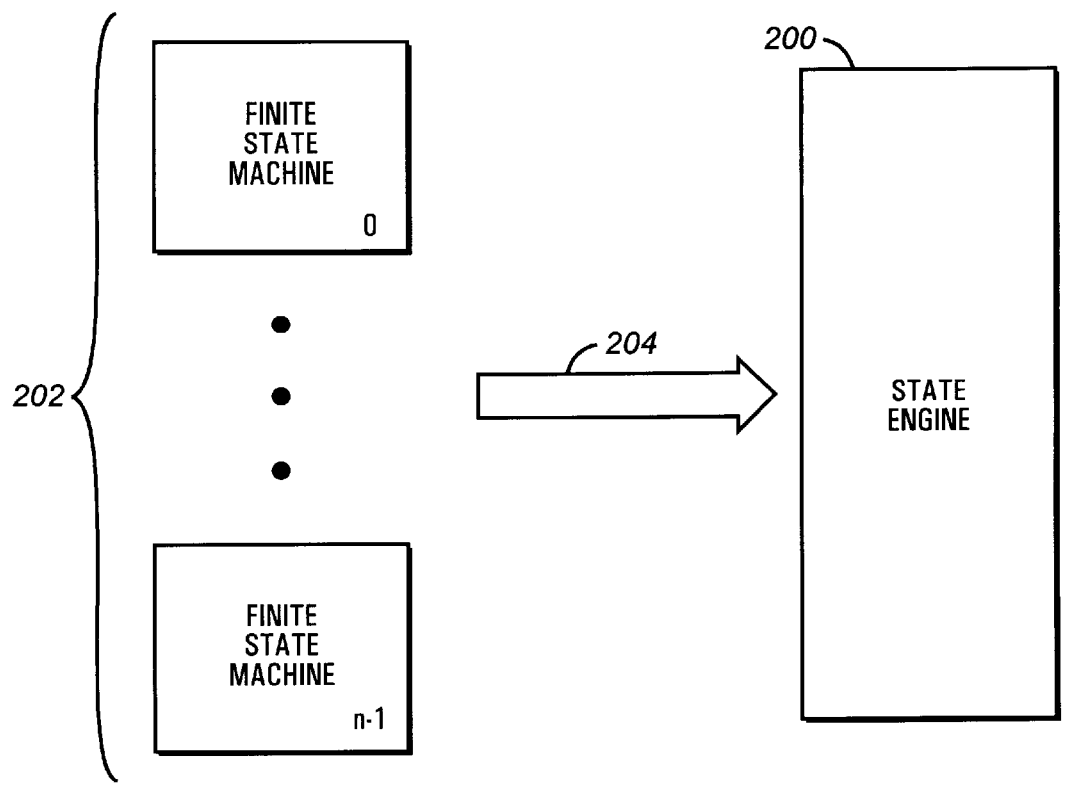
FIG. 2 is a functional block diagram illustrating a plurality of finite state machines and the state engine of FIG. 1.

Referring to FIG. 2, a state engine 200 for executing a plurality of finite state machines 202 is shown. An arrow 204 is illustrated to represent presentation of any finite state machine of the plurality of finite state machines 202 to the state engine 200 for execution. The plurality of finite state machines 202, which are illustrated as n (n representing any integer) finite state machines, may include finite state machines of various implementations as well as finite state machines for various applications. A finite state machine of the plurality of finite state machines 202 may be of any type. It will be apparent to those skill in the art based on this disclosure that any finite state machine may be configured for execution by the state engine 200. Due to the capability of executing different finite state machines by the state engine 200, execution of a finite state machine is independent of a hardware implementation of a finite state machine and also independent of a particular application of a finite state machine. The state engine 200 thus basically provides a general purpose execution methodology for multiple finite state machines.

Figure 3:
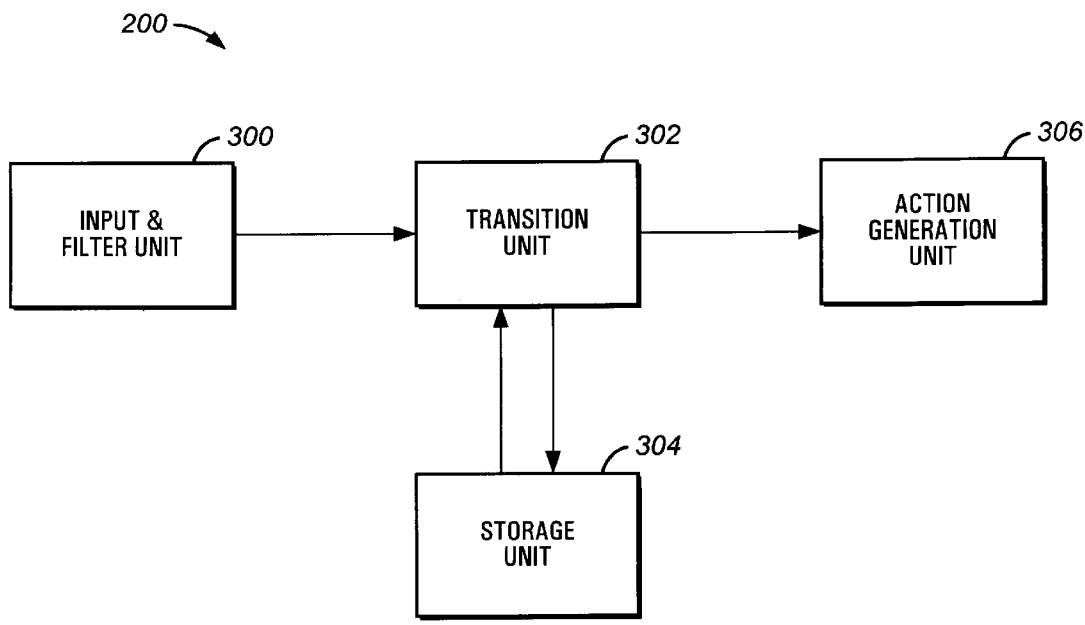
FIG. 3 is a functional logic diagram of the state engine of FIGS. 1 and 2 in accordance with the present invention.

Referring to FIG. 3, a functional logic diagram of the state engine 200 in accordance with the present invention is shown. The disclosed state engine 200 includes an input and filter unit 300, a transition unit 302, a storage unit 304, and an action generation unit 306. The input and filter unit 300 accepts inputs from a source internal (such as any on-chip unit) or external to the microcontroller M and translates the inputs to symbols. The symbols are passed from the input and filter unit 300 to the transition unit 302. Passing of the symbols by the input and filter unit 300 may take the form of a signal and write function.

Figure 5:
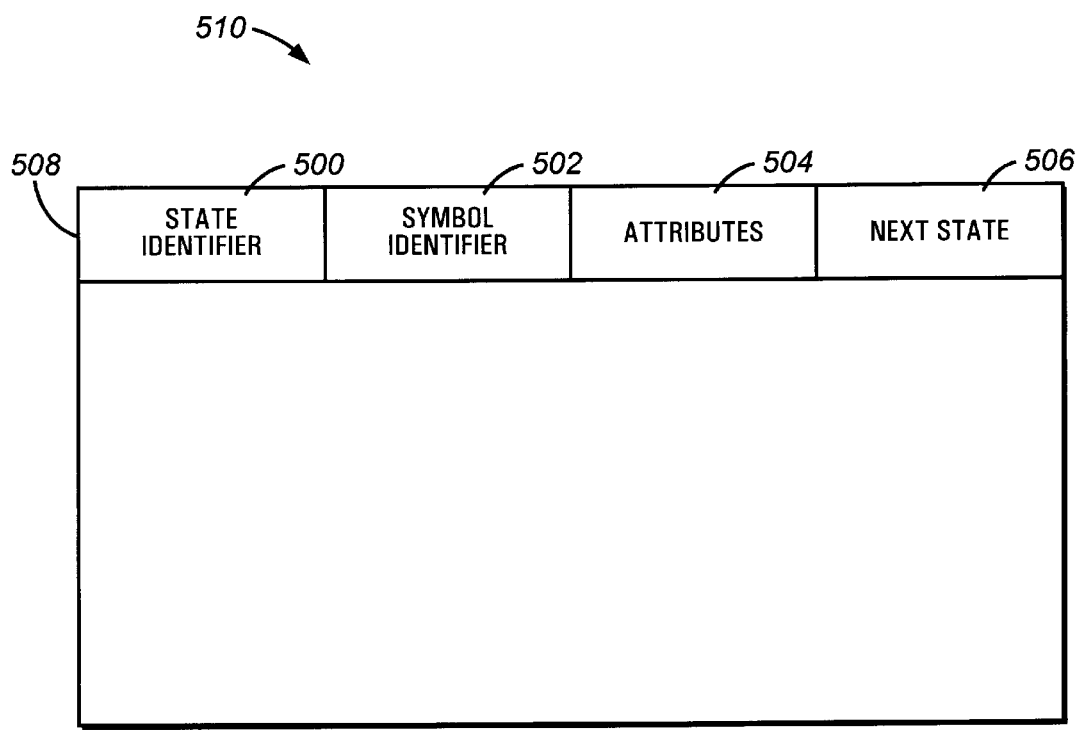
FIG. 5 is an exemplary state entry table stored by the storage unit of FIG. 3.

The storage unit 304 is a storage device such as a random access or content addressable memory for storing a plurality of state entries. A state entry is described in connection with FIG. 5. Referring to FIG. 5, an exemplary state entry table 510 that can be stored by the storage unit 304 is shown. In the disclosed embodiment, a state entry includes a state identifier, a symbol identifier, a plurality of state attributes, and a next state. Each row 508 of the state entry table 510 may be used to store a different state entry. The state entry table 510 may be divided into four columns: a state identifier field 500 for storing the state identifiers, a symbol identifier field 502 for storing the symbol identifiers, an attributes field 504 for storing the plurality of state attributes, and a next state field 506 for storing the next states. The attributes field 504 can be subdivided into sub-fields such that each type of state attribute corresponds to a different sub-field. A state attribute is essentially any attribute of a state entry which can affect the processing of the state entry. State entries relevant to a finite state machine can be loaded to the state entry table 510 before executing the particular finite state machine. After execution of a finite state machine by the state engine 200 is complete, state entries relevant to a next finite state machine can be loaded to the state entry table 510.

Returning to FIG. 3, the transition unit 302 maintains a variable called a current state. The current state serves to identify a state entry or set of state entries in the storage unit 304 having an "equivalent state". A state entry has an equivalent state if a state identifier of the state entry in the state entry table 510 matches a current state and if a symbol identifier of the state entry in the state entry table 510 matches a current symbol. A current symbol refers to the newly received or most recent symbol. A state entry having an equivalent state can also be termed a matching entry. The transition unit 302 can locate a matching entry by providing a look-up function for comparing the current state with the state identifier of each stored state entry and comparing the current symbol with the symbol identifier of each stored state entry. The storage unit 304 can provide a read function to the transition unit 302 responsive to the look-up function. The state entry table 510 can be readable and writeable by the transition unit 302.

A matching entry can also be a terminating entry. A state entry is a terminating entry if the state entry provides an active terminating attribute. A terminating attribute is one example of a type of state attribute that can be stored in the attributes field 504 of the state entry table 510. Other types of state attributes can also be supported The action generation unit 306 serves to process any terminating entries.

Figure 4:
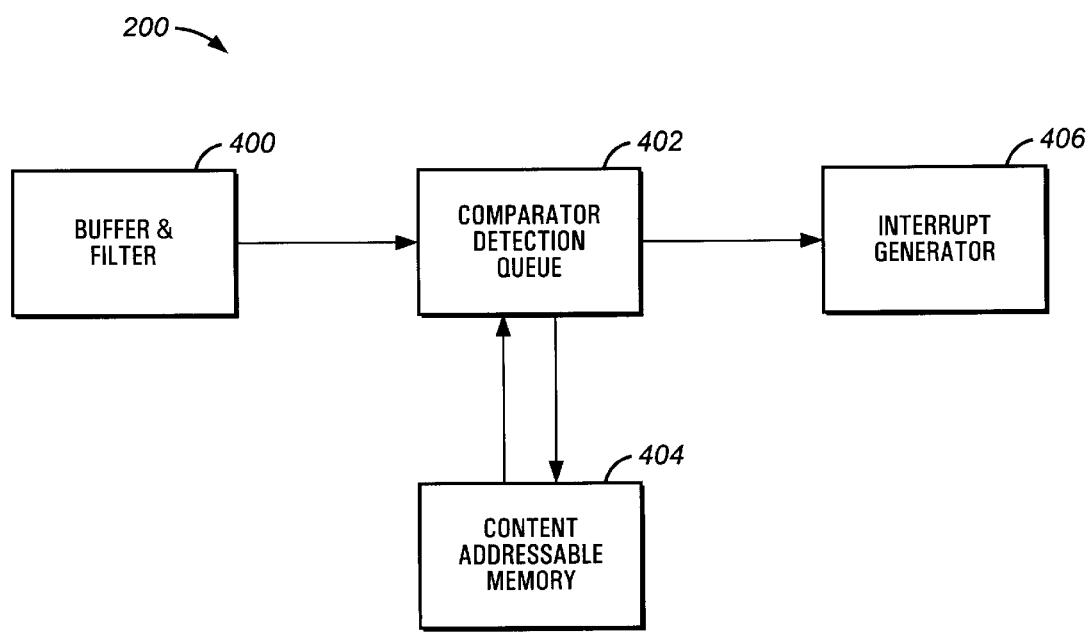
FIG. 4 is a functional logic diagram of an exemplary implementation of the state engine of FIG. 3.

Referring to FIG. 4, an exemplary implementation of the state engine 200 is shown. The disclosed implementation, which is one of many potential implementations, includes a buffer and filter 400, a comparator detection queue 402, a content addressable memory (or associative memory) 404, and an interrupt generator 406. The buffer and filter 400 serve as the input and filter unit 300. The buffer portion of the buffer and filter 400 is used for accepting inputs, and the filter portion of the buffer and filter 400 is used for translating the inputs to symbols. Other forms of logic or combinations of logic providing a buffering function and a translation function may also be suitable for implementing the input and filter unit 300. The comparator detection queue 402 serves as the transition unit 302. Other forms of logic or combinations of logic providing a comparator function and a queuing function may also be suitable for implementing the transition unit 302. The content addressable memory 404 serves as the storage unit 304. Other forms of logic or combinations of logic providing a comparator function and storage function (such as a cache memory) may also be suitable for implementing the storage unit 304. The interrupt generator 406 serves as the action generation unit 306. The interrupt generator 406 processes a terminating entry by providing a particular interrupt signal. Other forms of logic or combinations of logic for initiating activities in response to detection of events may also be suitable for implementing the action generation unit 306. It should be understood that the disclosed implementation of the state engine 200 is illustrative and not exhaustive, as alternative implementations are possible.

Figure 6:
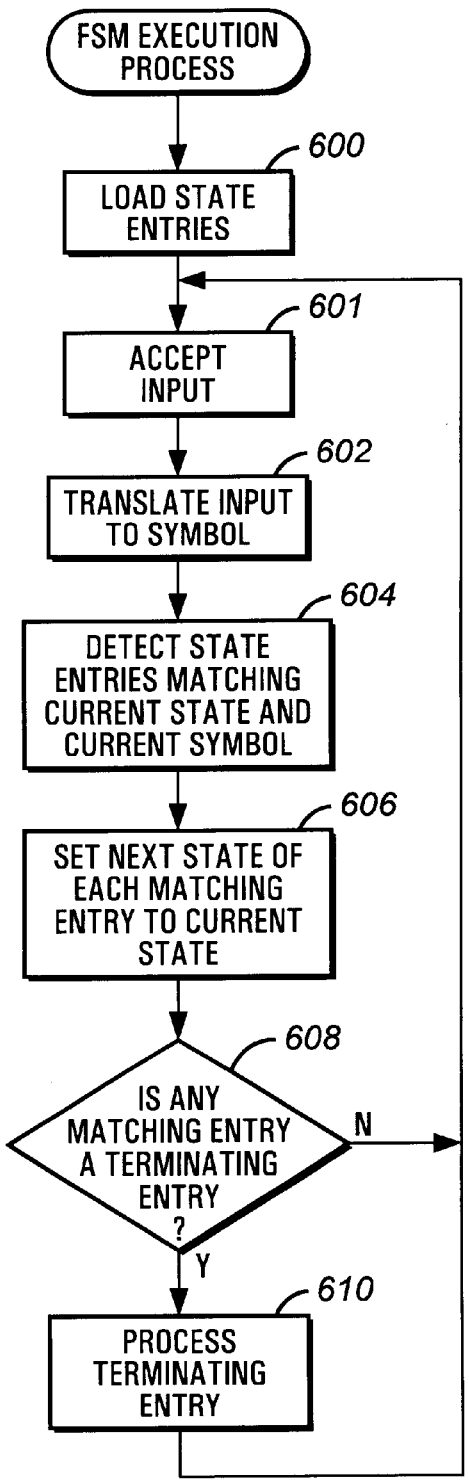
FIG. 6 is a flow chart of an exemplary finite state machine execution process performed by the state engine of FIG. 3 in accordance with the present invention.

Referring to FIG. 6, an exemplary finite state machine (FSM) execution process performed by the state engine 200 in accordance with the present invention is shown. The finite state machine execution process is applicable to any type of finite state machine and may be repeated for each finite state machine of the plurality of finite state machines 202 (FIG. 2). It should be understood that a finite state machine may be configured for execution by the state engine 200 using a state machine development tool.

Beginning in step 600, state entries for the finite state machine to be executed are loaded to the state entry table 510 residing in the storage unit 304. In the disclosed embodiment, the state entries may be loaded by the processor 101 (FIG. 1). In step 601, an input is accepted by the input and filter unit 300. Next, in step 602, the input and filter unit 300 translates the input to a symbol. Control then proceeds to step 604 where the state entries including a state identifier matching the current state and a symbol identifier matching the current symbol are detected. Detection of these matching entries can involve a look-up function by the transition unit 302. From step 604, control proceeds to step 606 where the next state of each matching entry is set to the current state.

Next, in step 608, it is determined if any matching entry is a terminating entry. If any matching entries are terminating entries, those matching entries are processed by the action generation unit 306 in step 610. A terminating entry can be processed based on the state identifier, the plurality of state attributes, and the symbol identifier of the terminating entry. Through steps 604, 606, 608 and 610, the appropriate state entries of the state entry table 510 are processed. From step 610, control returns to step 601. If there are no terminating entries, control returns from step 608 to step 601. Execution of a finite state machine is concluded when no additional inputs are received in step 601.

The disclosed finite state machine execution process thus provides dynamic execution of a finite state machine and a general purpose methodology for executing different types of finite state machines. The disclosed techniques for executing a finite state machine are also applicable to finite state machine models.

The foregoing disclosure and description of various embodiments are illustrative and explanatory thereof, and various changes in the components, logic, variables, and states, as well as in the details of the illustrated circuitry and construction and method of operation may be made without departing from the spirit and scope of the invention.

What is claimed is:

1. A dynamically programmable state engine for executing a finite state machine, comprising:
   an input and filter unit to accept inputs and translate the inputs to symbols;
   a storage unit to store a plurality of state entries, each state entry of the plurality of state entries including a state identifier, a symbol identifier, a plurality of state attributes, and a next state;
   a transition unit to maintain a current state, locate state entries in the storage unit having a state identifier matching the current state and a symbol identifier matching a current symbol, and set the current state to the next state of a matching entry; and
   an action generation unit activated when the matching entry is a terminating entry to process the terminating entry.

2. The dynamically programmable state engine of claim 1, wherein the input and filter unit comprises a buffer.

3. The dynamically programmable state engine of claim 1, wherein the input and filter unit comprises a filter.

4. The dynamically programmable state engine of claim 1, wherein the storage unit comprises a content addressable memory.

5. The dynamically programmable state engine of claim 1, wherein the action generation unit comprises an interrupt generator.

6. The dynamically programmable state engine of claim 1, wherein the transition unit comprises a comparator detection queue.

7. A dynamically programmable state engine for executing a finite state machine, comprising:
   a means for accepting inputs and translating the inputs to symbols;
   a means for storing a plurality of state entries, each state entry of the plurality of state entries including a state identifier, a symbol identifier, a plurality of state attributes, and a next state;
   a means for maintaining a current state, locating state entries in the storing means having a state identifier matching a current state and a symbol identifier matching a current symbol, and setting the current state to the next state of a matching entry; and
   a means for processing a matching entry if the matching entry is a terminating entry.

8. A method of dynamically executing a finite state machine, the method comprising the steps of:
   storing a plurality of state entries, each state entry including a state identifier, a symbol identifier, a plurality of state attributes, and a next state;
   accepting a first input;
   translating the first input to a symbol; and
   locating a state entry having a state identifier matching a current state and a symbol identifier matching a current symbol.

9. The method of claim 8, further comprising the step of:
   setting the current state to the next state of a matching entry if the matching entry is a terminating entry.

10. The method of claim 8, further comprising the step of:
    processing a matching entry if the matching entry is a terminating entry.

11. The method of claim 10, the processing step further comprising the step of:
    processing the terminating entry based on the state identifier, the plurality of state attributes, and the symbol identifier of the terminating entry.

12. The method of claim 8, further comprising the steps of:
    accepting a second input; and
    translating the second input to a symbol.

13. A general purpose state engine for executing a plurality of state machines, comprising:
    a means for storing a first plurality of state entries;
    a means for accepting and translating first inputs for a first state machine;
    a means for processing the appropriate state entries of the first plurality of state entries;
    a means for storing a second plurality of state entries;
    a means for accepting and translating second inputs for a second state machine; and
    a means for processing the appropriate state entries of the second plurality of state entries;
    wherein the first state machine and second state machine comprise different types of finite state machines.

14. The general purpose state engine of claim 13, wherein the means for storing a first plurality of state entries and the means for storing a second plurality of state entries, comprise a memory.

15. The general purpose state engine of claim 13, wherein the first state machine and second state machine are directed to different applications.

* * * * *